J. CARNEY.
COMBINED COVER AND CARRIER DEVICE FOR LIQUID CONTAINERS.
APPLICATION FILED FEB. 26, 1914.

1,125,469.

Patented Jan. 19, 1915.

WITNESSES:
David Hill
John J. Cosgrove
Nellie M. Gustin

INVENTOR.
JOHN CARNEY.
BY
Geo. H. Remington
ATTORNEY

UNITED STATES PATENT OFFICE.

JOHN CARNEY, OF PAWTUCKET, RHODE ISLAND.

COMBINED COVER AND CARRIER DEVICE FOR LIQUID-CONTAINERS.

1,125,469.  Specification of Letters Patent.  Patented Jan. 19, 1915.

Application filed February 26, 1914.  Serial No. 821,321.

*To all whom it may concern:*

Be it known that I, JOHN CARNEY, a citizen of the United States, residing at Pawtucket, in the county of Providence and State of Rhode Island, have invented certain new and useful Improvements in Combined Cover and Carrier Devices for Liquid-Containers, of which the following is a specification.

My invention relates to an improved combined handle and cover attachment for bottles, jars, and other analogous liquid containers, as hereinafter set forth and claimed.

In my improvement the arms of the handle or bail member extend downward through oppositely arranged guide openings formed in the metal cap or cover and are articulated or movably jointed below the cover to the metal band encircling the neck of the container. As thus devised the bail is maintained in an upright position and prevented from swinging by means of the cover itself when the latter is normally seated on the mouth of the bottle or container.

Figure 4:
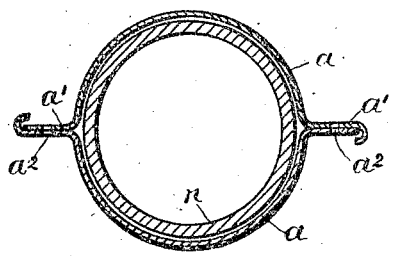
Figure 5:
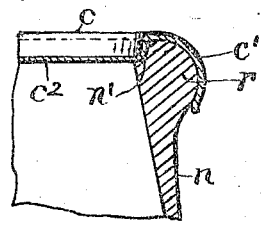
Figure 1:
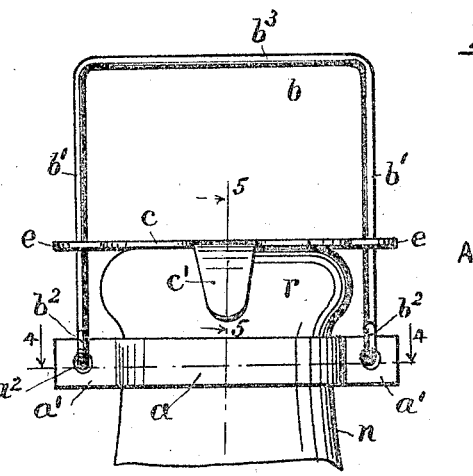
Figure 2:
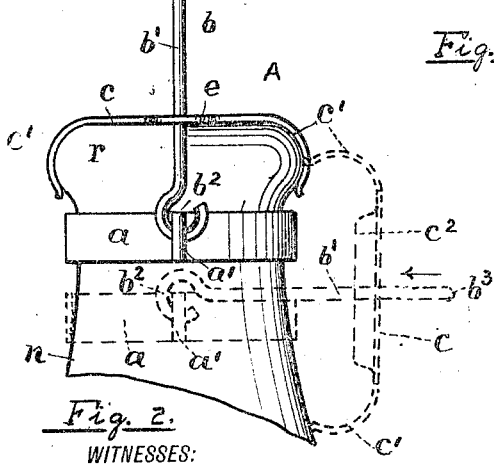
Figure 3:
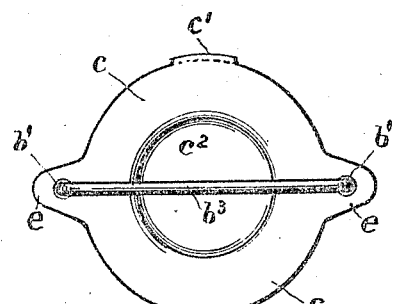

In the accompanying sheet of drawings, Figure 1 represents a side elevation of the upper portion of a container having my improved cover and handle attachment normally connected to it. Fig. 2 is a similar view, taken at right angles to Fig. 1, showing by dotted lines the position and relation of the parts to the vessel when the latter is uncovered or open. Fig. 3 is a top plan view of the device detached from the vessel. Fig. 4 is a horizontal cross-section taken on line 4 4 of Fig. 1, and Fig. 5 is a longitudinal section, on line 5 5 of Fig. 1, the band being omitted.

The following is a more detailed description of the invention.

A in the drawings, designates my improved cover, handle and carrier device as a whole, arranged to be easily and quickly attached to the neck $n$ of a bottle or container and as easily detached therefrom. The mouth of bottles of this general type are usually provided with a recessed seat $n^1$, substantially as indicated in Fig. 5. The cover member $c$ is formed integral from suitable, light, thin sheet metal, as aluminum, and having diametrically opposed clips $c^1$ possessing a degree of resiliency; said clips, when the device is in use, being sprung over the outer peripheral rim or enlargement $r$ formed at the mouth of the vessel. The cover is further provided with opposed flat perforated ears $e$ arranged in the same plane with the clips and located at substantially right angles to them, and having a recessed central portion $c^2$ preferably arranged to conform to the said recessed part $n^1$ of the bottle.

The metal band $a$ $a$ is bent to receive and encircle the neck of the bottle. The ends $a^1$ of the band may extend in opposite directions and be provided with registering perforations $a^2$ arranged to receive the open hook or eye ends $b^2$ of the handle $b$, soon to be described.

The handle or carrier member $b$ is formed from a length of wire, the same when bent has the form approximately of an inverted U, the horizontal arm or upper tie $b^3$ has its end portions extending downwardly and forming vertical side arms $b^1$, passing freely through the perforations of said ears $e$ and terminating in eyes $b^2$ connecting with the respective perforated ends $a^1$ of the band $a$. If desired one or both the said eyes $b^2$ may be separated sufficiently to readily permit of its insertion into or removal from the band.

It will be observed that in order to pour from the vessel as well as to refill it the device or attachment A would appear substantially as indicated by dotted lines in Fig. 2; and to remove the device altogether from the vessel a movement of the handle endwise toward the rear, see arrow direction Fig. 2, serves to disconnect the parts sufficiently to allow of the removal of the band from the vessel, preparatory to its attachment to another container, at will.

I claim:

The combination with a bottle or container provided with a reduced neck having an enlarged mouth, and a metal band encircling the neck and having opposed lugs carried by the ends thereof, a metal cap normally closing the mouth of the container, said cap having oppositely disposed perforations therethrough, and a bail member having a pair of depending outer arms extending through said perforations and movably jointed to said encircling band, said joint being located wholly below the closure cap, for the purpose set forth.

In testimony whereof I have affixed my signature in presence of two witnesses.

JOHN CARNEY.

Witnesses:
CHARLES C. REMINGTON,
GEO. H. REMINGTON.